W. H. Marshall,
Wheel.
No. 71,193.            Patented Nov. 19, 1867.
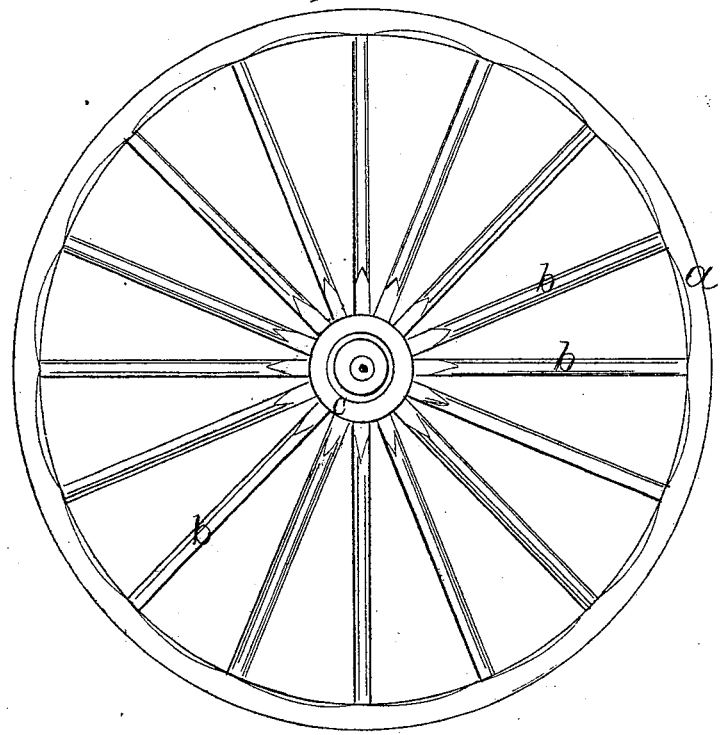
Inventor.
William H. Marshall
Witnesses.
Charles C. Marshall
Hiram H. Davis

United States Patent Office.

WILLIAM H. MARSHALL OF SUTTON, ASSIGNOR TO HIMSELF AND HOSEA B. SPAULDING, OF MERRIMACK, NEW HAMPSHIRE.

*Letters Patent No. 71,193, dated November 19, 1867.*

IMPROVEMENT IN CARRIAGE-WHEELS.

*The Schedule referred to in these Letters Patent and making part of the same.*

TO ALL WHOM IT MAY CONCERN:

Be it known that I, WILLIAM H. MARSHALL, of Sutton, in the county of Merrimack, and State of New Hampshire, have invented new and useful Improvements in Wheels; and I do hereby declare that the following is a full and exact description thereof, reference being had to the accompanying drawings and to the letters of reference marked thereon.

The nature of my invention consists in providing for wheels, spokes with double round tenons, and mortises in the hubs to correspond. It also relates to the peculiar manner in which the spokes are set in the hub, to arrive at the greatest strength.

To enable others skilled in the art to make and use my invention, I will proceed to describe its construction and operation.

Figure 1 represents a plan of my improved wheel.

Figure 2 represents a side elevation of the hub, showing the position of the spokes.

Figure 3 represents a horizontal section of fig. 1.

Similar letters in the different figures indicate corresponding parts.

$a$ represents the rim, $b\,b\,b$ the spokes, $c\,c$ the double round tenons, with their shoulders $d\,d;$ $e$ the hub, $f f$ the mortises, which correspond with the tenons $c\,c$, and are located and formed in the hub $e$, around its circumference zigzag, one half of the spokes $b\,b$, with their centres standing directly in under the centre of the rim $a$, the other half, with their centres standing outside and inside, alternate of the others, as seen in fig. 2. By thus arranging the spokes $b\,b$, one half support the rim $a$, the other half serving as braces, which support the rim $a$ on both sides. The hub $e$ being thus formed, the spokes $b\,b$, prepared with their double round tenons $c\,c$ and shoulders $d\,d$, the length of the tenons $c\,c$, corresponding with the depth of the mortises $f f$, are driven in with cement down on their shoulders $d\,d$, thus making the hub $e$ equally as strong as it was before the mortises $f f$ were made. The spokes $b\,b$ are then ready to receive the rim $a$ on the tenons of the rim end of the spokes $b\,b$, which had previously been prepared in the usual way.

When the wheel is thus completed, the hub $e$ retains its full strength. The spokes $b\,b$ being prepared and set as described, are more firm, and support the rim $a$ far better than the common straight spoke, and also superseding the double-spoke wheels, requiring a smaller spoke, which gives more space between them, which greatly facilitates the operation of cleaning the wheel. Thus the hub $e$ can be kept clean, rendering the spokes $b\,b$ less liable to become loose from the working of dust, dirt, &c., between the hub $e$ and the shoulders $d\,d$ of the spokes $b\,b$; and, also, instead of cutting into and through the hub, square mortises, the size of the spokes, as in the common wheels now in use, destroying almost entirely the middle of the hub, which weakens the wheel at this point; also the mortises being cut through the hub to the box, in lubricating the axle, the grease or oil works into and around the square tenons, which loosens the same. Two round holes are made, their diameter less than the thickness of the spokes $b\,b$, their depth corresponding with the length of the tenons $c\,c$. Thus by having two tenons to each spoke, we can use a much shorter tenon, requiring less depth of mortises, thus obviating the necessity of mortising through the hub to the box, leaving the hub around the box perfectly whole, making the hub stronger and better, thus giving the entire wheel beauty, symmetry, strength, and durability.

I do not claim constructing the spokes for wheels with single, round, square, or double square tenons, as they are old and in common use; but What I do claim, and desire to secure by Letters Patent, is—

I claim the double round tenons $c\,c$, in combination with the mortises $f f$, for the purposes as described and set forth.

WILLIAM H. MARSHALL.

Witnesses:
 CHARLES C. MARSHALL,
 HIRAM H. DAVIS.